(12) United States Patent
Stuckey

(10) Patent No.: US 7,282,086 B2
(45) Date of Patent: Oct. 16, 2007

(54) FLUID FILTER CLEANING APPARATUS

(76) Inventor: Jeffery Allen Stuckey, 4521 Sunnybrook Rd., Kent, OH (US) 44240

( * ) Notice: Subject to any disclaimer, the term of this patent is extended or adjusted under 35 U.S.C. 154(b) by 269 days.

(21) Appl. No.: 10/893,399

(22) Filed: Jul. 16, 2004

(65) Prior Publication Data
US 2005/0034601 A1    Feb. 17, 2005

Related U.S. Application Data

(60) Provisional application No. 60/487,661, filed on Jul. 16, 2003.

(51) Int. Cl.
*B01D 29/70* (2006.01)
*B01D 46/04* (2006.01)

(52) U.S. Cl. .................. 96/230; 96/233; 134/33; 134/153

(58) Field of Classification Search .............. 95/281, 95/282; 55/DIG. 24; 210/777, 797, 798, 210/168; 96/228, 230, 233; 134/153, 157, 134/151, 33
See application file for complete search history.

(56) References Cited

U.S. PATENT DOCUMENTS

| | | | | |
|---|---|---|---|---|
| 2,490,108 A | * | 12/1949 | Walkup | 210/215 |
| 2,555,866 A | * | 6/1951 | Weaver, Jr. et al. | 210/772 |
| 2,699,793 A | * | 1/1955 | Floyd et al. | 134/143 |
| 2,756,455 A | * | 7/1956 | Slaughter | 15/306.1 |
| 2,994,406 A | * | 8/1961 | Hemeon | 96/230 |
| 3,443,696 A | * | 5/1969 | Schutte | 210/297 |
| 3,552,405 A | * | 1/1971 | Apel | 134/65 |
| 3,596,439 A | * | 8/1971 | Moragne | 96/233 |
| 3,655,058 A | * | 4/1972 | Novak | 210/360.1 |
| 3,993,564 A | * | 11/1976 | Novak | 210/360.2 |
| 4,120,671 A | * | 10/1978 | Steinmeyer | 95/281 |
| 4,130,404 A | * | 12/1978 | Bergdahl | 96/230 |
| 5,112,369 A | * | 5/1992 | Brownell | 95/285 |
| 5,250,119 A | * | 10/1993 | Poschl | 134/32 |
| 6,156,213 A | * | 12/2000 | Dudley et al. | 210/791 |
| 6,627,166 B1 | * | 9/2003 | Simon | 423/210 |

* cited by examiner

*Primary Examiner*—Frank M. Lawrence
(74) *Attorney, Agent, or Firm*—Kathleen K. Bowen

(57) ABSTRACT

A filter cleaning apparatus for cleaning a filter using cleaning fluid comprises a housing, a filter holder for holding the filter, wherein the filter holder is mountable in the housing, a rotating means for rotating the filter holder, wherein the filter holder holds the filter such that when the filter holder rotates, the filter likewise rotates and, a cleaning fluid injector, wherein the cleaning fluid injector injects the cleaning fluid into the filter holder, such that when the filter holder is rotated, the cleaning fluid is forced through the filter by centrifugal force.

16 Claims, 3 Drawing Sheets

FLUID FILTER CLEANING APPARATUS

This application claims the benefit of U.S. Provisional Application No. 60/487,661, filed Jul. 16, 2003.

BACKGROUND

The present invention is in the field of cleaning filters. More specifically this invention relates to an apparatus for cleaning filters with a fluid.

Air filters for engines are generally of two types, paper-type disposable filters, and more durable wire mesh or pre-oiled foam type re-useable filters. Filter cleaning apparatus have been designed with the paper-type filter in mind, such as U.S. Pat. No. 6,428,588 by Holyoak et al. This apparatus uses air forced into a spinning filter to clean. This apparatus is complex in that it requires a vacuum chamber, an electric motor, and delicate alignment of the filter axis, and is only suitable for dry, non-oiled paper type filter media.

In contrast, wire mesh or pre-oiled foam type filters have typically been cleaned by hand, either by repeatedly dipping the filter in a cleaning solution, or pouring a cleaning solution over the filter. This is a very dirty and time-consuming process. After cleaning, the pre-oiled foam type filters then need to be pre-oiled again, which is also done by hand.

An apparatus is desired which would clean wire mesh or pre-oiled foam type filters using a cleaning solution. This apparatus should be simple to use and economical. Further it is desired that this same apparatus be able to pre-oil the filter for future use.

SUMMARY OF THE INVENTION

A filter cleaning apparatus for cleaning a filter using cleaning fluid comprises a housing, a filter holder for holding the filter, wherein the filter holder is mountable in the housing, a rotating means for rotating the filter holder, wherein the filter holder is such that when the filter holder rotates, the filter likewise rotates and, a cleaning fluid injector, wherein cleaning fluid injector injects the cleaning fluid into the filter holder, such that when the filter holder is rotated, the cleaning fluid is forced through the filter by centrifugal force.

DETAILED DESCRIPTION

Figure 1:
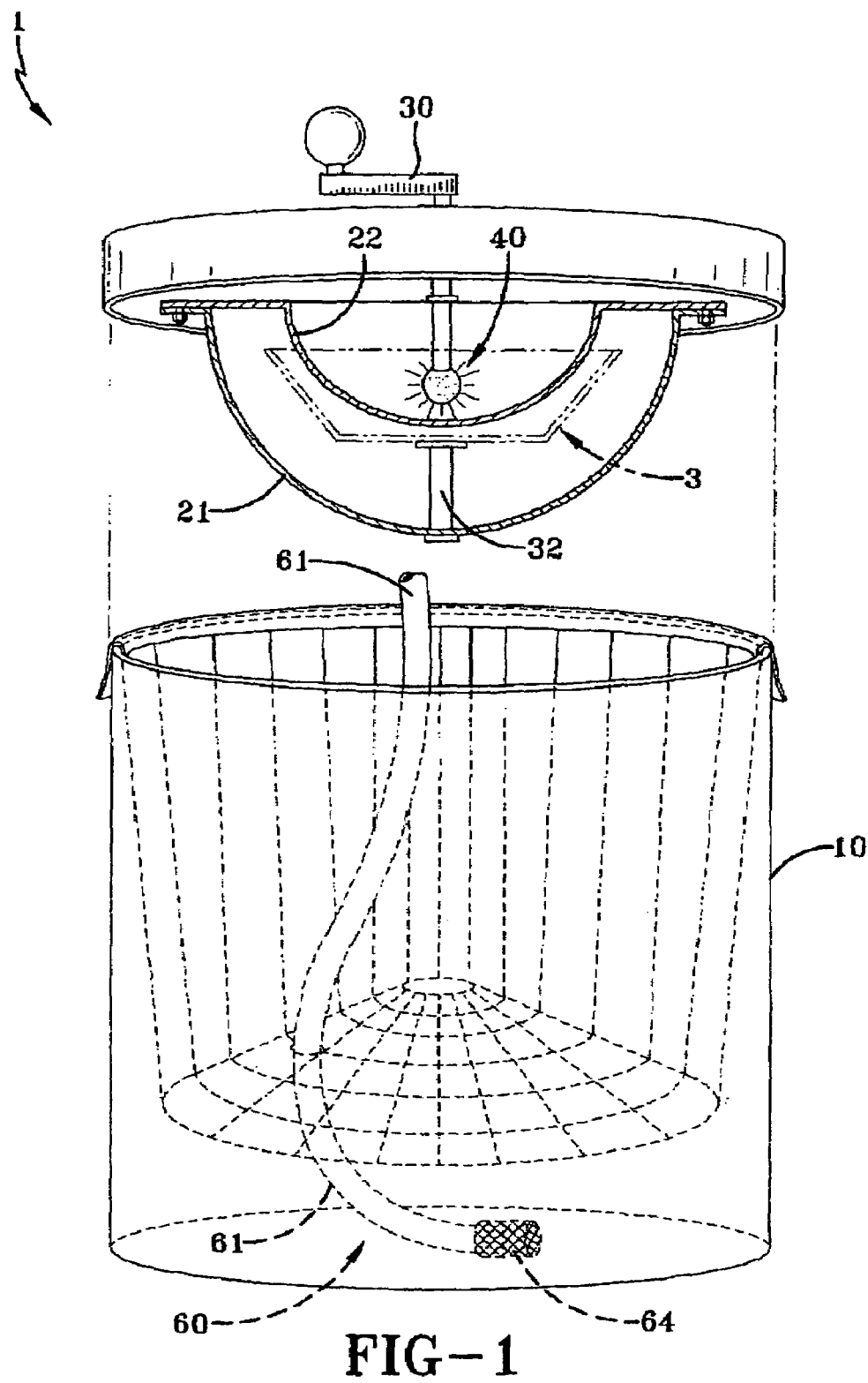
FIG. 1 is an isometric view of a filter cleaning apparatus according to an aspect of the invention.

Various aspects of the invention are presented in FIGS. 1-3b which are not drawn to scale and in which like components are numbered alike. Referring now to FIGS. 1-3b, according to an aspect of the invention, a filter cleaning apparatus 1 for cleaning a filter 3 using cleaning fluid comprises a housing 10, a filter holder 20, a rotating means 30, and a cleaning fluid injector 40. The filter holder 20 holds the filter 3, and is mountable in the housing 10. The rotating means 30 rotates the filter holder 20. The cleaning fluid injector 40 injects the cleaning fluid from a cleaning fluid supply 70 into the filter holder 20, such that when the filter holder 20 is rotated, the cleaning fluid is forced through the filter 3 by centrifugal force, typically in reverse flow direction 7 of normal filter flow 6.

Figure 3A:
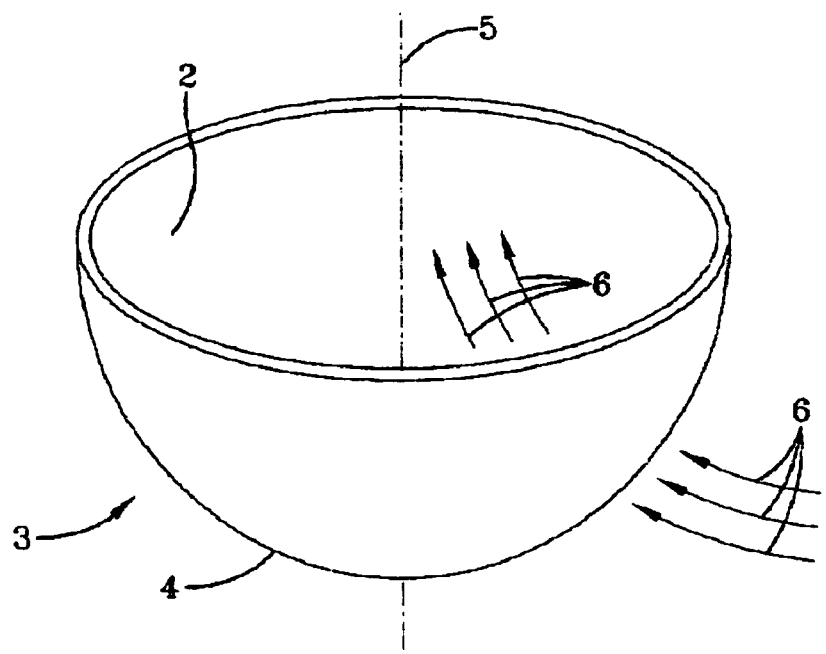
FIG. 3A is an isometric view of a filter.
Figure 3B:
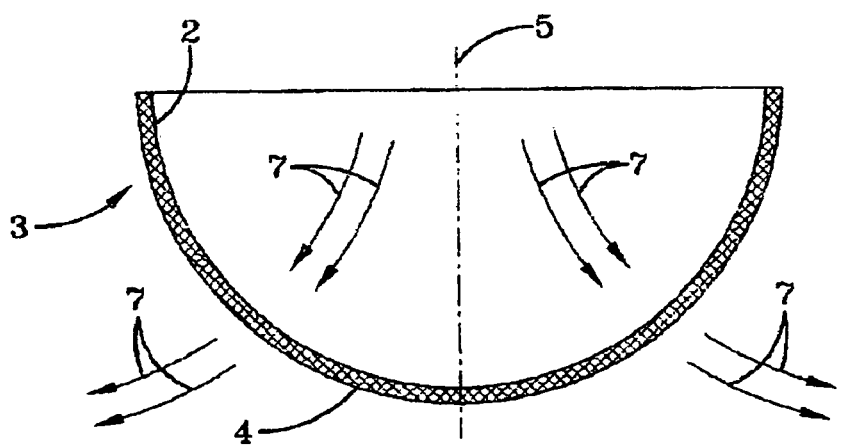
FIG. 3B is a section view of filter.

Referring now to FIGS. 3a and 3b, the type of filters intended for use with this invention generally have an inside 2 and an outside 4. During normal use, the filtered medium generally flows from the outside 4 to the inside 2, this is normal filter flow 6. During operation of this invention, a cleaning fluid flows from the filter inside 2 to the filter outside 4. In order to allow centrifugal force to force the cleaning fluid through in this reverse flow direction 7, the filter 3 should spin approximately about its central axis 5.

The filter holder 20 is designed such that when the filter holder 20 rotates, the filter 3 likewise rotates. There are many ways in which this can be accomplished. According to an aspect of the invention, the filter holder 20 is a mesh enclosure 21, wherein the filter 3 sits in the mesh enclosure 21. In this design, friction between the mesh enclosure 21 and the filter 3 would cause the filter 3 to rotate with the filter holder 20. According to a further aspect of the invention, the mesh enclosure 21 is of a size and shape to keep the filter 3 roughly centered. To ensure that the filter 3 remains in place, and spins approximately about its central axis 5, a shaft 32 may go through the center of the filter 3. This shaft 32 may have a dual purpose of being a drive shaft for the rotating means 30. An alternate method for ensuring the filter remains roughly centered is a mesh insert 22 which will 'sandwich' the filter between the mesh enclosure 21, and the mesh insert 22. These methods are examples only, as any appropriate method for keeping the filter roughly centered is considered within the purview of this invention.

According to an aspect of the invention, the rotating means 30 is a hand operated lever or crank. In a further embodiment, the rotating means 30 is a motor.

According to a further aspect of the invention, the cleaning fluid injector 40 comprises a nozzle 42 which releases cleaning fluid into the inside 2 of the filter 3. In a preferred embodiment, the nozzle 42 releases the cleaning fluid multidirectionally. Ideally, the nozzle 42 sprays the cleaning fluid such that when the filter holder 20 is rotated, the cleaning fluid contacts the entire filter 3. To help the cleaning fluid contact the entire filter 3, in a further embodiment, the cleaning fluid supply 70 is pressurized.

After a filter of this type has been cleaned, it may need to be dried before it may be used again. In a preferred embodiment, low pressure air is supplied to the filter cleaning apparatus to aid in the drying of the clean filter.

After a filter of this type has been cleaned, it may need to be pre-oiled before it may be used. This is also true of a new filter before it is placed in service for the first time. According to an aspect of the invention, the filter cleaning apparatus 1 further comprises an oil injector 50, wherein the oil injector 50 sprays oil from an oil supply 80 into the filter holder 20, such that when the filter holder 20 is rotated, the oil is forced through the filter 3 by centrifugal force in reverse flow direction of normal filter flow 6. In a preferred embodiment, the oil injector 50 comprises a nozzle 52 which sprays oil onto the inside 2 of the filter 3. In order to better oil the filter, according to an aspect of the invention, the nozzle 52 sprays the oil multidirectionally. In a preferred embodiment, this is done such that when the filter holder 20 is rotated the oil contacts the entire inside 2 of the filter 3. In a further embodiment, the oil injector supply 80 is pressurized. According to an aspect fo the invention, the oil injector 50 may further comprise a pump.

Figure 2:
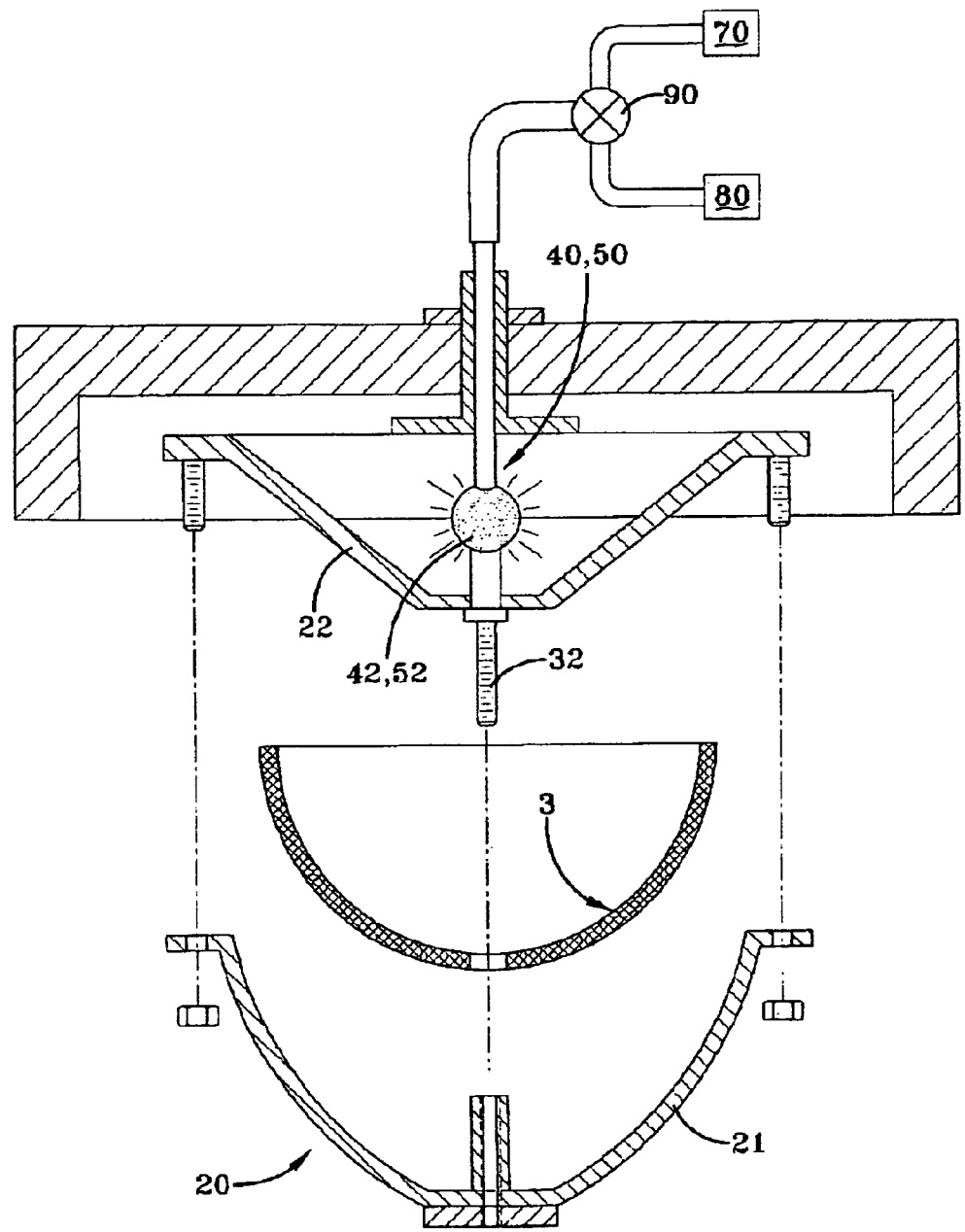
FIG. 2 is a section-side view of a portion of a filter cleaning apparatus, according to an aspect of the invention.

The oil injector 50 and the cleaning fluid injector 40 may be the same apparatus, just connected to a different fluid source, this is how it is shown in FIGS. 1 and 2. Operation of the filter cleaning apparatus 1 would also include a selector valve 90, or some other appropriate means for switching between the oil supply 80 and the cleaning fluid supply 70.

According to a further aspect of the invention, there is a suction mechanism 60 at or near the bottom of the housing 10. The suction mechanism 60 is used to suction out the used cleaning fluid, or excess oil. According to an aspect of the invention, the suction mechanism 60 has a strainer 64 to keep contaminants out, so that the suctioned cleaning fluid or oil may be re-used. According to an aspect of the invention, the suctioned cleaning fluid or oil may be immediately returned to the respective source, to be re-used in the same operation. In a preferred embodiment, the suction mechanism 60 comprises a hose 61 with a screen strainer 64.

According to a preferred embodiment, the housing 10 is an appropriate size bucket, and the filter holder 20 is mounted to a lid for the bucket. Thus the entire filter cleaning apparatus 1 may be the lid of a standard 5-gallon bucket, with a hand crank mechanism attached to the top of the lid, with the drive mechanism protruding through the lid, and attachable to the filter holding basket on the inner side of the lid. The filter holding basket sized to hold a variety of standard filter sizes and shapes, would hold the filter roughly centered, and rotate with the drive mechanism.

According to a further aspect of the invention, there is a method of cleaning a pre-oiled, or mesh type filter.

According to a further aspect of the invention, there is a method of pre-oiling a cleaned filter.

According to a further aspect of the invention, there is a method of pre-oiling a new filter.

I claim:

1. An adaptable filter cleaning apparatus for use on any appropriate sized housing, for cleaning a filter using cleaning fluid comprising:
   a lid which may be placed on any appropriate sized housing;
   a filter holder for holding the filter, wherein said filter holder is removably mounted to said lid;
   a rotating means for rotating said filter holder, wherein said filter holder holds said filter such that when said filter holder rotates, the filter likewise rotates, and wherein said rotating means is also mounted to said lid; and,
   a cleaning fluid injector, wherein said cleaning fluid injector injects the cleaning fluid into the filter holder, such that when said filter holder is rotated, the cleaning fluid is forced through the filter by centrifugal force, and wherein said cleaning fluid injector is also mounted to said lid.

2. The filter cleaning apparatus of claim 1 wherein said filter holder is a mesh basket, wherein the filter sits in said mesh basket.

3. The filter cleaning apparatus of claim 1 wherein said filter holder is a mesh basket, wherein the filter sits in said mesh basket, and wherein said mesh basket is of a size and shape to keep the filter roughly centered in said mesh basket.

4. The filter cleaning apparatus of claim 1 wherein said rotating means is a hand crank.

5. The filter cleaning apparatus of claim 1 wherein the rotating means is a motor.

6. The filter cleaning apparatus of claim 1 wherein the filter has an inside and an outside, and wherein said cleaning fluid injector comprises a nozzle which sprays cleaning fluid onto the inside of the filter.

7. The filter cleaning apparatus of claim 6 wherein said cleaning fluid injector is supplied with a pressurized supply of cleaning fluid.

8. The filter cleaning apparatus of claim 6 wherein said nozzle sprays the cleaning fluid multi-directionally.

9. The filter cleaning apparatus of claim 6 wherein said nozzle sprays the cleaning fluid multi-directionally, such that when said filter holder is rotated the cleaning fluid contacts the entire filter.

10. The filter cleaning apparatus of claim 1 further comprising an oil injector, wherein said oil injector sprays oil into said filter holder, such that when said filter holder is rotated, the oil is forced through the filter by centrifugal force, wherein said oil injector is also mounted to said lid.

11. The filter cleaning apparatus of claim 10 wherein the filter has an inside and an outside, and wherein said oil injector comprises a nozzle which sprays oil onto the inside of the filter.

12. The filter cleaning apparatus of claim 11 wherein said oil injector is supplied with a pressurized supply of oil.

13. The filter cleaning apparatus of claim 11 wherein said nozzle sprays the oil multi-directionally.

14. The filter cleaning apparatus of claim 11 wherein said nozzle sprays the oil multi-directionally, such that when said filter holder is rotated the oil contacts the entire filter.

15. The filter cleaning apparatus of claim 1 wherein the housing is an appropriate size bucket, end wherein said lid is a lid of said bucket.

16. The filter cleaning apparatus of claim 10 wherein said oil injector is said cleaning fluid injector, wherein said cleaning fluid injector is supplied with oil.

* * * * *